United States Patent
Kim et al.

(10) Patent No.: US 8,498,664 B2
(45) Date of Patent: Jul. 30, 2013

(54) METHOD AND APPARATUS FOR HANDLING BARRED CELL IN WIRELESS COMMUNICATION SYSTEM

(75) Inventors: Sun Hee Kim, Gyeonggi-do (KR); Sung Hoon Jung, Gyeonggi-do (KR); Seung June Yi, Gyeonggi-do (KR); Sung Duck Chun, Gyeonggi-do (KR); Sung Jun Park, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 472 days.

(21) Appl. No.: 12/978,912

(22) Filed: Dec. 27, 2010

(65) Prior Publication Data

US 2011/0244902 A1  Oct. 6, 2011

Related U.S. Application Data

(60) Provisional application No. 61/320,762, filed on Apr. 4, 2010, provisional application No. 61/323,311, filed on Apr. 12, 2010, provisional application No. 61/321,112, filed on Apr. 5, 2010.

(30) Foreign Application Priority Data

Sep. 30, 2010 (KR) .......................... 10-2010-0095299

(51) Int. Cl.
*H04B 7/00* (2006.01)

(52) U.S. Cl.
USPC ........... 455/525; 455/410; 455/411; 455/517; 455/432.1; 455/434

(58) Field of Classification Search
USPC ................. 455/525, 517, 500, 445, 410, 411, 455/422.1, 403, 426.1, 426.2, 432.1, 434, 455/435.1, 435.2, 432.3, 509, 507, 511, 515, 455/558, 550.1, 412.1, 412.2; 370/310, 328, 370/329, 338, 343
See application file for complete search history.

(56) References Cited

U.S. PATENT DOCUMENTS

2013/0040608 A1* 2/2013 Piercy et al. ............... 455/411
2013/0051366 A1* 2/2013 Amerga et al. ............. 370/331

* cited by examiner

*Primary Examiner* — Keith Ferguson
(74) *Attorney, Agent, or Firm* — Morgan, Lewis & Bockius LLP

(57) ABSTRACT

A method of handling a barred cell in a wireless communication system is disclosed. The method of handling a barred cell in a user equipment using a plurality of frequencies includes releasing a Radio Resource Control (RRC) connection between the user equipment and a network if authentication between the user equipment and the network fails, and regarding a cell having a first uplink radio link and a first downlink radio link, a cell having only a second uplink radio link and a cell having only a second downlink radio link as barred cells, if the RRC connection is released.

23 Claims, 9 Drawing Sheets

VERIFICATION OF AUTHENTICATION FAILURE
WHEN UE PERFORMS AUTHENTICATION PROCESS (a)

VERIFICATIO OF AUTHENTICATION FAILURE
WHEN NETWORK PERFORMS AUTHENTICATION PROCESS (b)

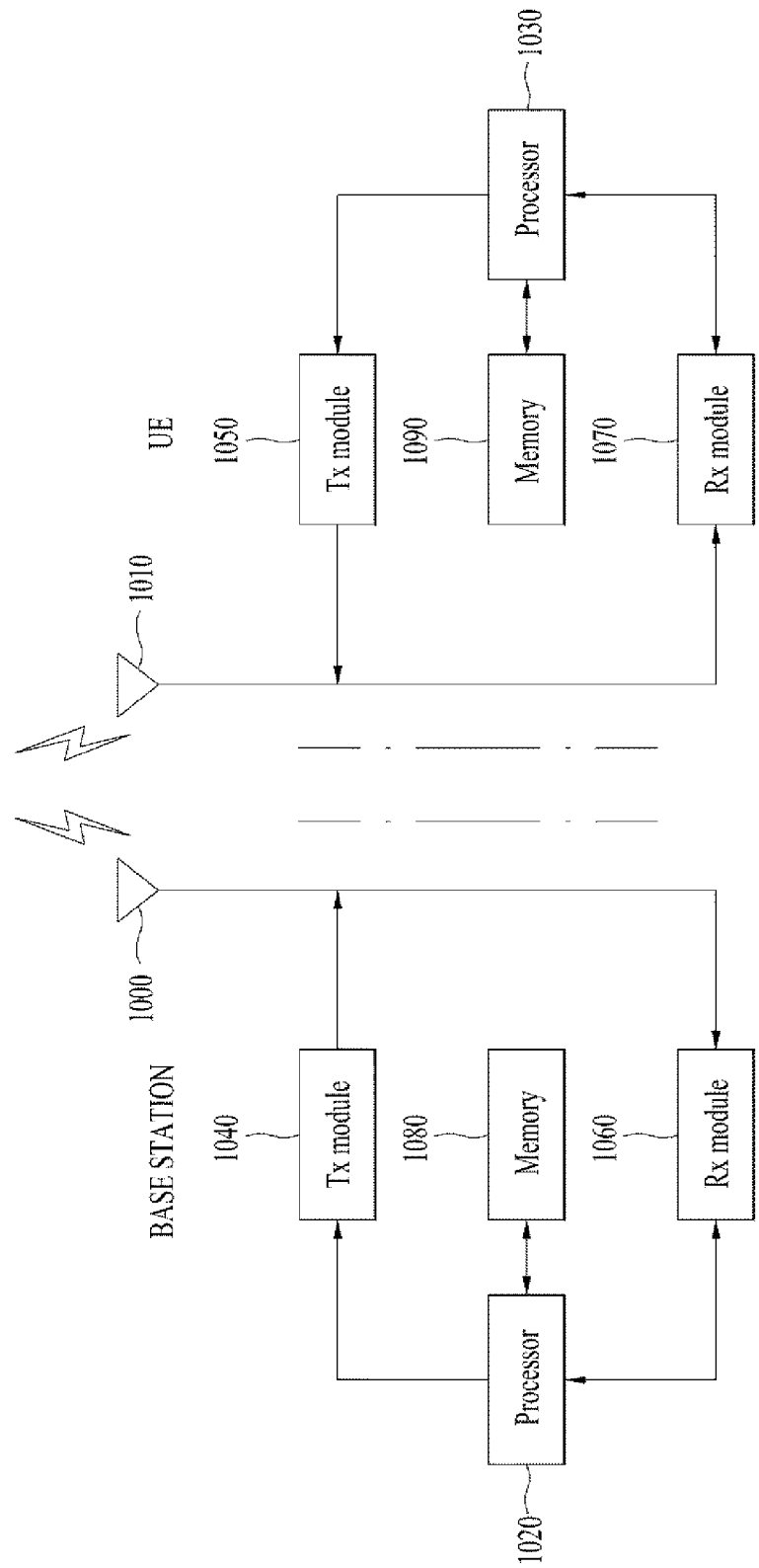

METHOD AND APPARATUS FOR HANDLING BARRED CELL IN WIRELESS COMMUNICATION SYSTEM

This application claims the benefit of Korean Patent Application No. 10-2010-0095299, filed on Sep. 30, 2010, which is hereby incorporated by reference as if fully set forth herein.

This application also claims the benefit of U.S. Provisional Application Ser. Nos. 61/320,762, filed on Apr. 4, 2010, 61/323,311, filed on Apr. 12, 2010, and 61/321,112, filed on Apr. 5, 2010, the content of which is hereby incorporated by reference herein in their entirety.

BACKGROUND OF THE INVENTION

1. Field of the Invention

The present invention relates to a wireless communication system, and more particularly, to a method and apparatus for handling a barred cell in a wireless communication system.

2. Discussion of the Related Art

First, a network structure of a Universal Mobile Telecommunications System (UMTS) will be described with reference to FIG. 1.

FIG. 1 is a diagram showing a network structure of a UMTS. As shown in FIG. 1, the UMTS includes a user equipment (UE), a UMTS terrestrial radio access network (UTRAN) and a core network (CN). The UTRAN includes one or more radio network sub-systems (RNSs) and each RNS includes one radio network controller (RNC) and one or more base stations (Node Bs) managed by the RNC. One or more cells may exist per a single base station.

Next, the structure of a radio protocol used in the UMTS will be described with reference to FIG. 2. FIG. 2 is a diagram showing the structure of the radio protocol used in the UMTS. Pairs of radio protocol layers exist in the UE and the UTRAN, and perform data transfer over an air interface. In the radio protocol layers, a physical (PHY) layer, which is a first layer, is responsible for data transfer over an air interface using various radio transfer technologies. The PHY layer is connected to a medium access control (MAC) layer, which is a higher layer, through a transport channel, and the transport channel is divided into a dedicated transport channel and a common transport channel depending on whether or not the channel is shared.

A MAC layer, a radio link control (RLC) layer and a broadcast and multicast control (BMC) layer exist in a second layer. The MAC layer maps various logical channels to various transport channels and performs logical channel multiplexing to map a plurality of logical channels to one transport channel.

The MAC layer is connected to the RLC layer, which is a higher layer, through a logical channel. The logical channel is divided into a control channel for transmitting information on a control plane and a traffic channel for transmitting information on a user plane, according to the kind of transmitted information. Examples of the control channel include a Common Control Channel (CCCH) logical channel for transmitting common control information, a Dedicated Control Channel (DCCH) logical channel for transmitting control information to a specific UE, a Broadcast Control Channel (BCCH) logical channel for receiving system information commonly applied to a cell, a Paging Control Channel (PCCH) for receiving a paging message, etc. A Dedicated Traffic Channel (DTCH) for transferring data of the user plane to a specific UE exists in the traffic channel.

In addition, the MAC layer is divided into a MAC-b sublayer, a MAC-d sublayer, a MAC-c/sh sublayer, a MAC-hs/ehs sublayer, and a MAC-e/es or a MAC-i/is sublayer, according to the kind of the managed transport channel. The MAC-b sublayer is responsible for management of a Broadcast Channel (BCH) which is a transport channel for broadcasting system information, the MAC-c/sh sublayer is responsible for management of a Forward Access Channel (FACH) common transport channel shared with the other UEs, and the MAC-d sublayer is responsible for management of a Dedicated Channel which is a dedicated transport channel of a specific UE. In addition, the MAC-hs/ehs sublayer manages a High Speed Downlink Shared Channel (HS-DSCH) for high-speed downlink data transmission and the MAC-e/es or MAC-i/is sublayer manages an Enhanced Dedicated Channel (E-DCH) which is a transport channel for high-speed uplink data transmission.

The RLC layer guarantees Quality of Service (QoS) of a Radio Bearer (RBs) or data transmission. The RLC has one or two independent RLC entities for each RB in order to guarantee the QoS of the RB. In order to guarantee various QoSs, three operation modes, i.e., a Transparent Mode (TM), an Unacknowledged Mode (UM), and an Acknowledged Mode (AM), are provided. In addition, the RLC is responsible for adjustment of a data size to suit data transmission over an air interface and is responsible for segmentation and concatenation of data received from a higher layer.

A Packet Data Convergence Protocol (PDCP) layer is located at a high level of the RLC layer and enables data transmitted as IP packets such as IPv4 or IPv6 packets to be efficiently transmitted over an air interface with a narrow bandwidth. The PDCP layer performs a header compression function to transmit only necessary information in a header part of data, thereby increasing transfer efficiency of the air interface. Since the PDCP layer has header compression as a basic function, the PDCP layer exists in a packet switched (PS) region and one PDCP entity exists per RB in order to provide an efficient header compression function to each PS service. However, if the PDCP layer exists in a circuit switched (CS) region, the header compression function is not provided.

In the second layer, a Broadcast/Multicast Control (BMC) layer is located at a level above the RLC layer so as to perform a function for scheduling a cell broadcast message and broadcasting the cell broadcast message to UEs located in a specific cell.

A Radio Resource Control (RRC) layer located at the lowermost level of the third layer is defined only in the control plane and is responsible for control of the parameters of the first layer and the second layer in association with configuration, re-configuration and release of Radio Bearers (RBs), and is responsible for control of the logical, transport and physical channels. The RB is a logical path that the first and second layers of the radio protocol provide for data communication between the UE and the UTRAN. Generally, Radio Bearer (RB) configuration means that a radio protocol layer necessary to provide a specific service and channel characteristics are defined and their detailed parameters and operation methods are configured.

A Non Access Stratum (NAS) layer located at a higher level of the third layer includes a Mobility Management (MM) entity and a Connection Management (CM) entity. The MM entity performs a Temporary Mobile Subscriber Identity (TMSI) reassignment process, an authentication process, a UE identification process, an International Mobile Subscriber Identity (IMSI) appending process, etc., identifies each UE, and manages several UEs. In addition, the MM entity manages current location information of a UE through a location information updating process. The CM entity provides and controls a service provided by a network. Accordingly, the CM entity performs connection establishment, management and termination of a voice call, connection establishment, management and termination of session corresponding to data communication and provision and control of a Short Message Service (SMS), or connection establishment, management and termination of a supplementary service.

Next, a dual cell High Speed Packet Access (HSPA) will be described. The dual cell HSPA indicates technology of transmitting data, which was transmitted performed by a UE through an E-DCH only using one frequency in the past, using two frequencies so as to increase data transmission rate to twice that of the related art. An operation for transmitting data using two frequencies by the UE is referred to as a dual cell E-DCH operation. In addition, in a downlink, in the related art, the UE received a High Speed Downlink Shared Channel (HS-DSCH) using one frequency. An operation for simultaneously receiving data using two frequencies so as to double the data reception rate is referred to as a High Speed Downlink Packet Access (HSDPA) operation.

In the related art, an active set is defined as a set of cells having both an uplink radio link and a downlink radio link in one cell. Accordingly, in a UE which performs a dual cell HSDPA operation, a first cell having both one uplink radio link and one downlink radio link belongs to the active set and a second cell having only a downlink radio link does not belong to the active set.

If the UE which performs the dual cell HSDPA operation receives an RRC connection release message from a higher layer due to authentication failure, the UE releases all connected radio resources and regards the first cell belonging to the active set as a barred cell before going to an idle mode. The second cell does not belong to the active set and thus is not regarded as the barred cell.

Accordingly, when the UE selects a new cell after going to the idle mode, the UE may reselect the second cell if the radio environment of the second cell is good. However, since the authentication process failed in the second cell, the authentication process may fail even when connection establishment with the second cell is performed. Thereafter, a higher layer of the UE transmits an RRC connection release message to an RRC layer and the UE regards the second cell as the barred cell and does not reselect the second when selecting a new cell. That is, an additional unnecessary cell selection process may be performed during the dual cell HSDPA operation.

As described above, in the related art, an unnecessary cell selection process may be performed.

SUMMARY OF THE INVENTION

Accordingly, the present invention is directed to a method and apparatus for handling a barred cell in a wireless communication system using a plurality of uplink frequencies that substantially obviates one or more problems due to limitations and disadvantages of the related art.

An object of the present invention is to provide a cell selection method capable of preventing an unnecessary cell selection process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of handling a barred cell in a user equipment of a wireless communication system using a plurality of frequencies includes releasing a Radio Resource Control (RRC) connection between the user equipment and a network if authentication between the user equipment and the network fails, and regarding a cell having a first uplink radio link and a first downlink radio link, a cell having only a second uplink radio link and a cell having only a second downlink radio link as barred cells, if the RRC connection is released.

The method may further include receiving an RRC connection release message from the network.

The method may further include selecting a cell suitable for camp-on except the barred cells.

The wireless communication system may be a Universal Mobile Telecommunication System (UMTS), a cell having the first uplink radio link and the first downlink radio link may be included in an active set, and the active set may be a set of radio links between the user equipment and the network.

The barred cells may include a primary serving High Speed-Downlink Shared Channel (HS-DSCH) cell and all secondary serving HS-DSCH cells.

The wireless communication system may be a Long Term Evolution (LTE) system and the barred cells may include a primary serving High Speed-Downlink Shared Channel (HS-DSCH) cell and all secondary serving HS-DSCH cells.

The authentication between the user equipment and the network may be performed at a Non-Access Stratum (NAS) layer of the user equipment.

If the authentication between the user equipment and the network fails, the NAS layer may request RRC connection release to an RRC layer of the user equipment.

Each of the first downlink radio link and the second downlink radio link may be identified by a frequency and a cell identifier, the frequency may be at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier may be at least one of a Primary Scrambling Code (PSC) and a Physical Cell Identifier (PCI).

Each of the first uplink radio link and the second uplink radio link may be identified by a frequency and a cell identifier, the frequency may be at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN) which are uplink frequencies to transmit data through the uplink radio link, and the cell identifier may be at least one of an uplink scrambling code, a Physical Random Access Channel (PRACH) scrambling code or a Physical Cell Identifier (PCI) and a Cell Radio Network Temporary Identifier (C-RNTI).

Each of the first uplink radio link and the second uplink radio link may be identified by a frequency and a cell identifier of a downlink radio link to receive control information necessary for uplink transmission, the frequency may be at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier may be at least one of an uplink scrambling code, a Physical Random Access Channel (PRACH) scrambling code or a Physical Cell Identifier (PCI) and a Cell Radio Network Temporary Identifier (C-RNTI).

In another aspect of the present invention, a user equipment of a wireless communication system using a plurality of frequencies includes a processor configured to release a Radio Resource Control (RRC) connection between the user equipment and a network if authentication between the user equipment and the network fails and to regard a cell having a first uplink radio link and a first downlink radio link, a cell having only a second uplink radio link and a cell having only a second downlink radio link as barred cells.

According to the embodiments of the present invention, it is possible to prevent an unnecessary cell selection process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram showing the configuration of a transmitter and a receiver in which the embodiments of the present invention can be implemented.

DETAILED DESCRIPTION OF THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a Universal Mobile Telecommunications System (UMTS), but the present invention is applicable to other mobile communication systems excluding the unique matters of the UMTS.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE) and a mobile station (MS), and a base station includes a node of a network end communicating with a terminal, such as a Node-B, an eNode B, and a base station.

First, dual cell High Speed Packet Access (HSPA) will be described with reference to FIG. 3.

Figure 1:
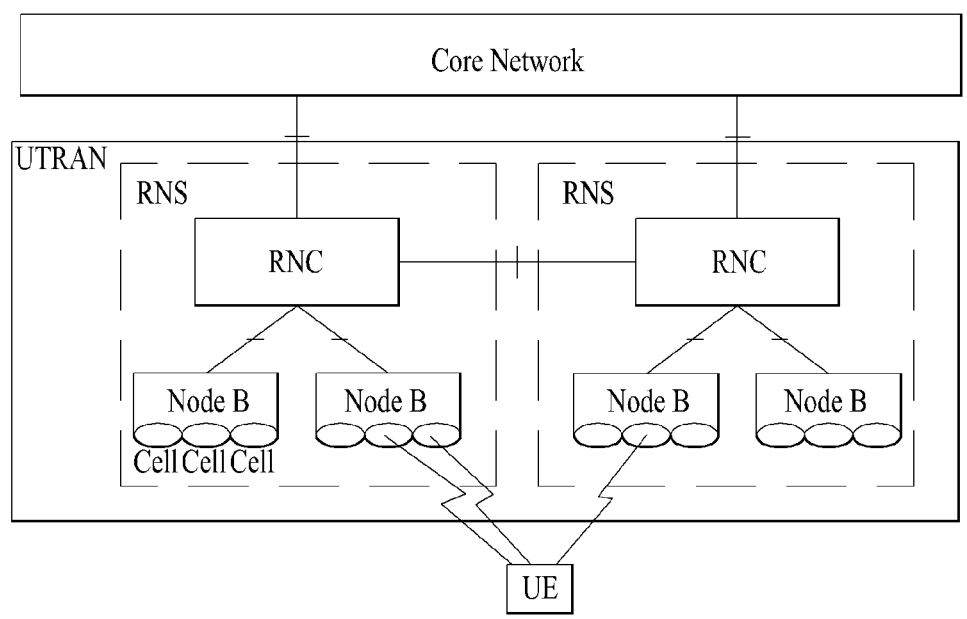
FIG. 1 is a diagram showing a network structure of a Universal Mobile Telecommunications System (UMTS)
Figure 2:
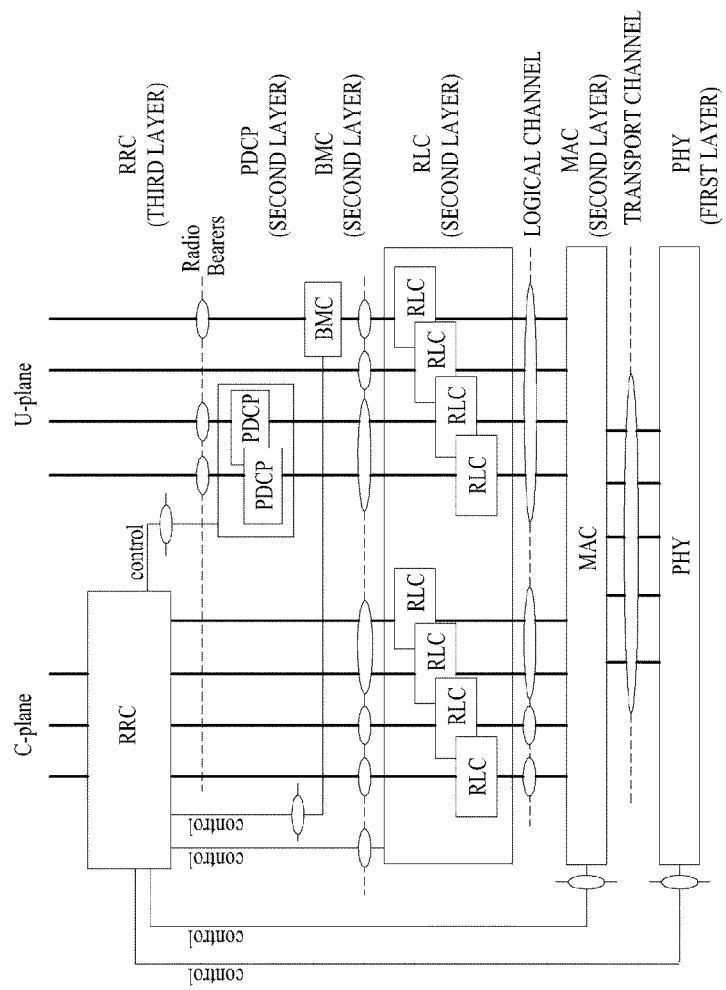
FIG. 2 is a diagram showing a structure of a radio protocol used in a UMTS.
Figure 3:
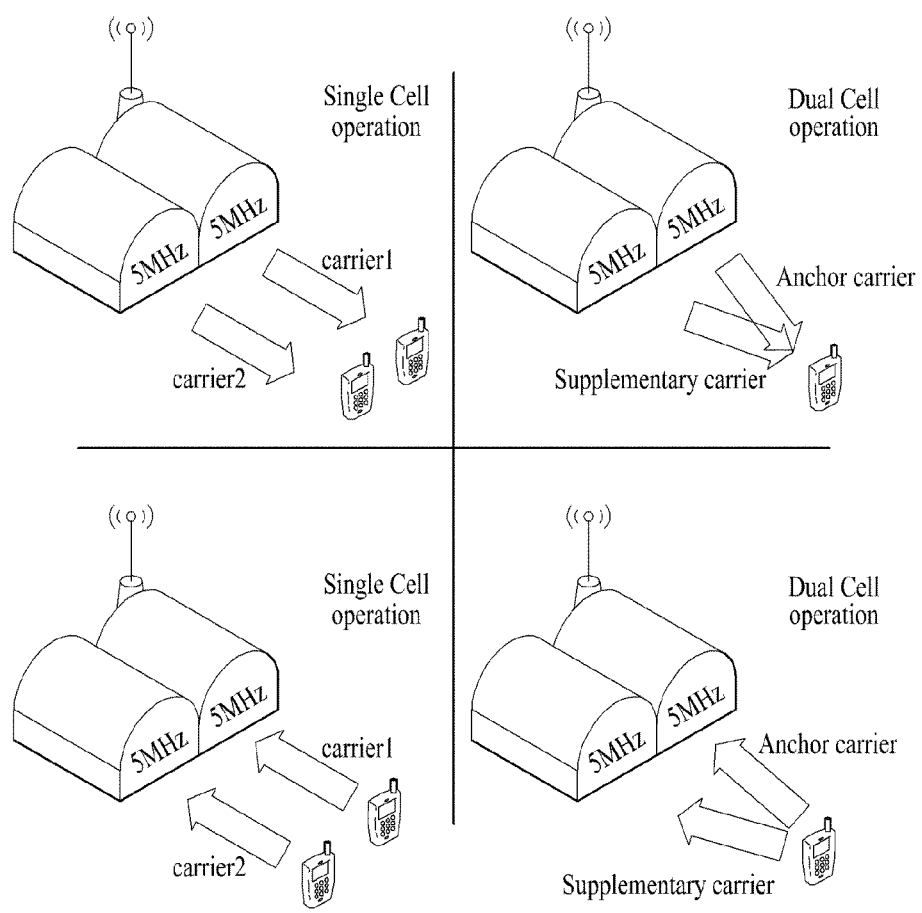
FIG. 3 is a diagram showing dual cell High Speed Packet Access (HSPA)

FIG. 3 is a diagram showing a dual cell HSPA.

As shown in FIG. 3, in the related art, a UE transmitted an Enhanced Dedicated Channel (E-DCH) using one frequency. However, in the dual cell HSPA, the UE simultaneously transmits data using two frequencies such that data transfer rate increases to twice that of the related art. In the dual cell HSPA, the UE may transmit data at a maximum rate of 20 Mbps, and an operation for transmitting data using two frequencies by the UE is referred to as a dual cell E-DCH operation.

In addition, even in a downlink, in the related art, the UE received a High Speed Downlink Shared Channel (HS-DSCH) using one frequency. However, in the dual cell HSPA, one UE receives data using two frequencies so as to double a data reception rate. In the dual cell HSPA, the UE may receive data at a maximum rate of 80 Mbps, and an operation for simultaneously receiving data using two frequencies is referred to as a dual cell HSDPA operation. One UE may simultaneously receive data using four frequencies so as to increase a data reception rate to four times that of the basic HS-DSCH. This is referred to as a four-carrier HSDPA operation.

A cell which receives a downlink control signal necessary for data transmission through a primary uplink frequency of a UE in a dual cell HSPA is referred to as a serving HS-DSCH cell or a primary serving HS-DSCH cell. In addition, cells other than the serving HS-DSCH cell among cells in which a UE receives data are referred to as secondary serving HS-DSCH cells. At this time, the primary uplink frequency is an uplink frequency in which a HS-DPCCH channel for transmitting an acknowledgement/non-acknowledgement (ACK/NACK) of the received downlink data exists.

Figure 4:
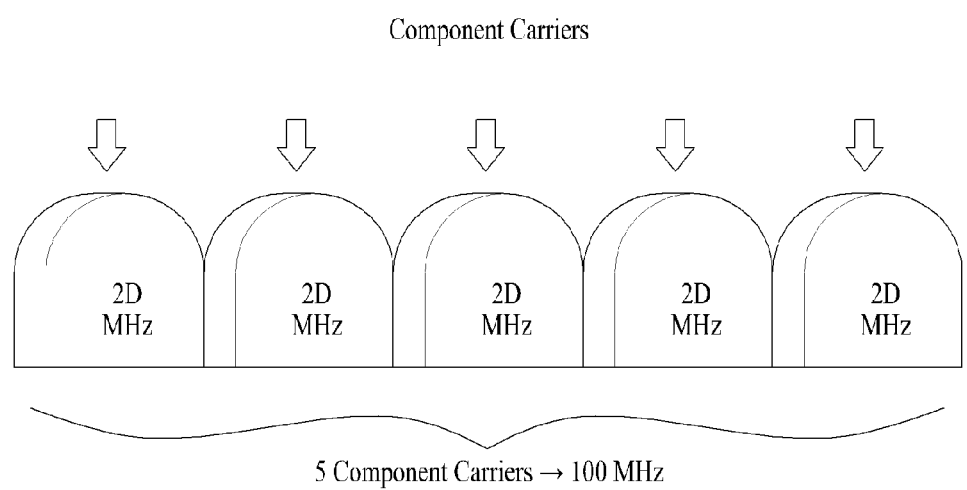
FIG. 4 is a diagram showing carrier aggregation of a Long Term Evolution-Advanced (LTE-A) system.

Next, Carrier Aggregation (CA) of an LTE-A system will be described with reference to FIG. 4. FIG. 4 is a diagram showing the CA of the LTE-A system.

The LTE-A technology standard is IMT-Advanced candidate technology of the International Telecommunication Union (ITU) and is designed to suit the requirements of the IMT-Advanced technology of the ITU. In the LTE-A, in order to satisfy the requirements of the ITU, extension of a bandwidth of the existing LTE system is being discussed. In the LTE-A system, in order to extend the bandwidth, a carrier of the existing LTE system is defined as a Component Carrier (CC) and a method of aggregating and utilizing a maximum of five CCs is being discussed. Since the CC may have a maximum bandwidth of 20 MHz as in the LTE system, the bandwidth may extend to 100 MHZ as a maximum. Technology of aggregating a plurality of CCs is referred to as carrier aggregation.

If CA is applied, a UE has a primary serving cell Pcell and a secondary serving cell Scell. At this time, the primary serving cell is a cell on which the UE camps. Alternatively, the primary serving cell is a cell which is commonly informed by a network through an SIB. The secondary serving cells refer to cells other than the primary serving cell among cells which can perform data reception.

Figure 5:
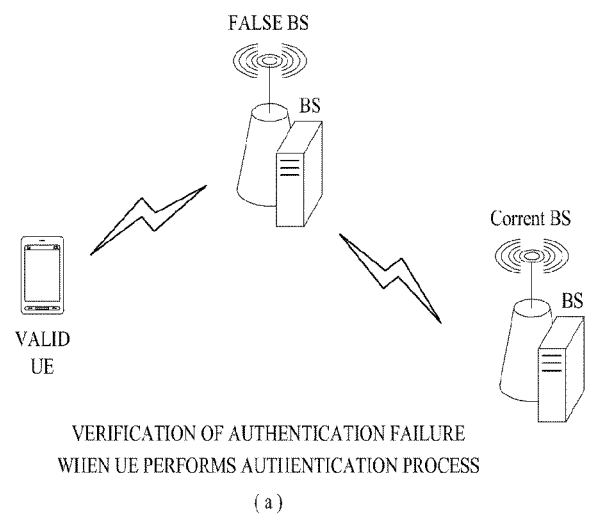
FIG. 5 is a diagram showing the case where authentication between a user equipment (UE) and a network fails.
Figure 5:
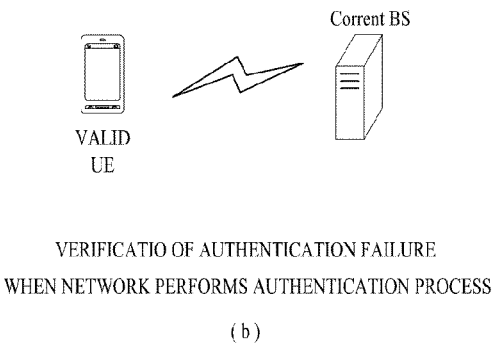

Next, an authentication process between a UE and a network will be described with reference to FIGS. 5 and 6. FIG. 5 is a diagram showing the case where authentication between a UE and a network fails.

FIG. 5(a) shows the case where authentication fails when the UE performs the authentication process and FIG. 5(b) shows the case where authentication fails when the network performs the authentication process.

In general, the UE in an idle mode accesses the network so as to perform data transmission and reception. However, although it is appeared that the UE and the network successfully perform data transmission and reception, a false base station (BS) may illegally acquire information about a UE such that a false network taps a specific UE. In addition, an unauthorized UE may access a network so as to perform data transmission and reception free. Accordingly, in order to prevent such illegal data transmission and reception, periodically or when a UE accesses a network, the UE and the network perform an authentication process. In the authentication process, if the authentication process between the network and the UE fails, the network releases the cell currently accessed by the UE. This is because the cell accessed by the UE which fails in authentication is regarded as a cell which is not authenticated by the network. Alternatively, this is because the network determines that all current radio links have been tapped and thus releases all radio resources.

It is difficult for the network and the UE to detect a false BS, because the false BS receives a message transmitted from the network to the UE or from the UE to the network and transmits the message without change. At this time, the false BS may tap a non-encrypted message. An encrypted value or a value which is subjected to an authentication process may not be handled by the false BS. In addition, the false BS may correct and transmit a message transmitted by the UE or the network. However, since an International Mobile Subscriber Identity (IMSI) value present in an RRC connection request transmitted by the UE or an encrypted message is transferred without encryption or integrity check, the false BS may know the IMSI value of the UE.

Figure 6:
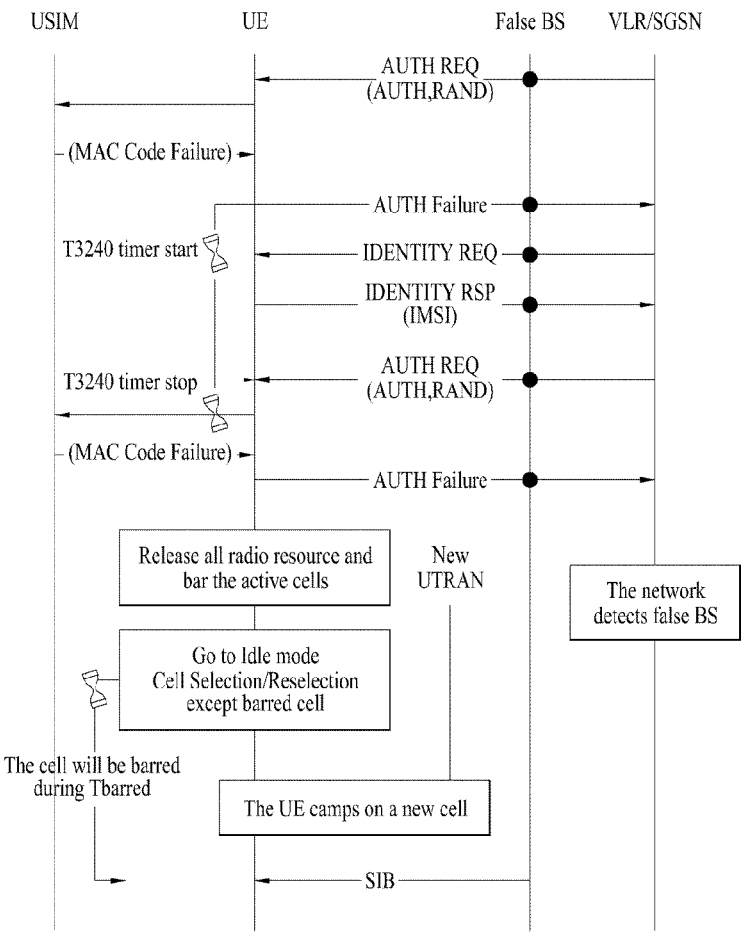
FIG. 6 is a diagram showing an authentication process between a UE and a network.

FIG. 6 is a diagram showing an authentication process between a UE and a network.

The network transmits an authentication request message AUTH REQ including an AUTH value, a RAND value and a MAC value to the UE. The RAND value is updated whenever a message is transmitted. The UE derives the MAC value using the AUTH value and the RAND value transmitted by the network and compares the derived MAC value with the received MAC value. If the derived MAC value is not equal to the received MAC value, the UE transmits an authentication failure message AUTH Failure to the network.

The network which receives the authentication failure message transmits an identity request message IDENTITY REQ for requesting the IMSI value to the UE, and the UE transmits an identity response message IDENTITY RSP including the IMSI to the network. Then, the network generates and transmits a new authentication request message based on the received IMSI to the UE. The AUTH value and the RAND value included in the new authentication request message are updated to new values.

If the UE fails in the authentication process even though the network transmits the new authentication message, the UE determines that a false BS is present. This is because the false BS may transmit the received message without change or change the message. If the UE determines that authentication failure occurs by the false BS, all the connected radio resources are released. If the UE is in a Cell_DCH state before going to an idle mode, all cells present in the active set are barred and, if the UE is in the other states, a cell on which the UE camps is barred. Such barring is continuously performed until the UE updates a new SIB message. The reason why the UE releases both the active set or the cell on which the UE camps is because all connected radio links are regarded as being tapped.

Next, the operation of the UE when authentication failure occurs will be described. When the UE receives an RRC connection release message from a higher layer due to authentication failure, the UE releases all connected radio resources and goes to an RRC idle mode.

The UE regards all the cells present in the active set or the cell, on which the UE camps, as the barred cells before going to the RRC idle mode, and searches for a cell suitable for the camp-on except the barred cell.

The reason why the UE regards all the cells present in the active set as the barred cells is because the UE fails in the authentication process with respect to all the radio links regarded as the active set and the all the radio links are not trusted.

A cell is a wireless network object for transmitting a broadcast message from one UTRAN access point to all UEs present in one specific area and is identified by a cell identifier. A cell, on which the UE camps, refers to a cell selected after a UE successfully completes a cell selection process and a cell reselection process.

Next, a cell state and cell reservation will be described. The network identifies a cell state by a barred cell and a non-barred cell in order to control the cell selection process and the cell reselection process of the UE. The barred cell indicates a cell on which the UE cannot camp and the non-barred cell indicates a cell on which the UE can camp.

A cell, on which a general UE cannot camp in order to enable a network manager to utilize the cell for a special purpose, is referred to as a reserved cell and the other cells are referred to as non-reserved cells. In the cell selection process and the cell reselection process, the UE does not regard the barred cell as a selectable cell. The UE regards a non-barred cell or a non-reserved cell as a selectable cell.

A suitable cell refers to a cell in which the UE can receive a public-use service. A suitable cell is a non-barred cell in which the intensity of a signal measured by the UE is greater than the intensity of a signal of a cell, which currently provides a service to the UE, by a predetermined value, which belongs to a Public Land Mobile Network (PLMN) which can be accessed by the UE, and in which a location area updating process or a tracking area updating process of the UE is not inhibited.

From the viewpoint of the UE which uses a plurality of frequencies as in the dual cell HSDPA, the cell includes one downlink and one uplink associated therewith. However, in the system using the plurality of frequencies, the cell does not always include one uplink and one downlink. The UE may include two downlinks or four downlinks and one uplink. In this case, a downlink without an uplink associated therewith may be present. That is, a cell including only downlinks or a cell including uplinks may be present.

Next, the active set will be described with reference to FIGS. 7 and 8.

A radio link is a logical relationship between one UE and one network apparatus.

A downlink radio link is identified by a frequency and a cell identifier, and the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier is at least one of a Primary Scrambling Code (PSC) and a Physical Cell Identifier (PCI).

An uplink radio link is identified by a frequency and a cell identifier. The frequency is at least one of a UARFCN and an EARFCN which are uplink frequencies to transmit data through the uplink radio link. In the UMTS, the cell identifier is an uplink scrambling code or a Physical Random Access Channel (PRACH) scrambling code. In the LTE system, the cell is identified by a PCI and a Cell Radio Network Temporary Identifier (C-RNTI).

Alternatively, the uplink radio link may be identified by the frequency and the cell identifier of the downlink radio link to receive control information necessary for uplink transmission.

The active set refers to a set of radio links for performing a specific communication service between the UE and the network, and a cell present in the active set is a cell located in an area in which soft handover is possible. Due to handover, during actual data transmission, data transmission may be performed through one or more radio links.

Figure 7:
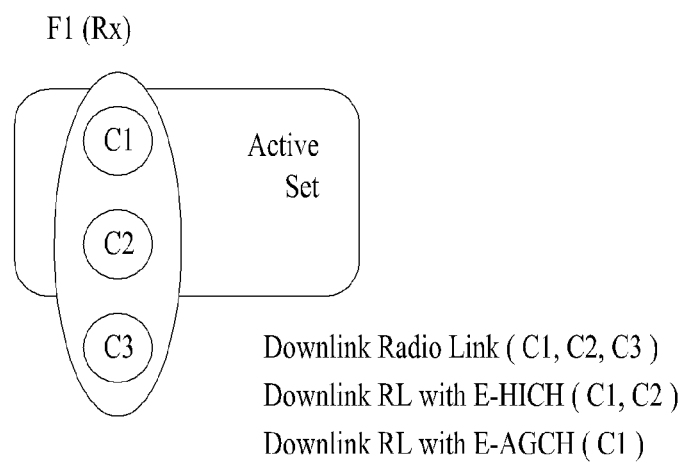
FIG. 7 is a diagram showing an E-DACH active set if a UE uses one frequency.

FIG. 7 is a diagram showing an E-DACH active set if a UE uses one frequency. The active set includes an active set for DCH transmission and an E-DCH active set for E-DCH transmission. The active set generally refers to an active set for DCH and E-DCH transmission. The E-DCH forms a pair with a HS-DSCH. For E-DCH transmission, the UE receives a grant through an E-AGCH and receives an ACK/NACK signal of the transmitted data through an E-HICH. If the UE can receive data using three radio links C1, C2 and C3 through the HS-DSCH, radio links C1 and C2 which can perform E-HICH reception are present and a radio link C1 through which the UE receives the E-AGCH is present, C1 and C2 are included in the active set of the UE and C3 are not included in the active set of the UE.

Figure 8:
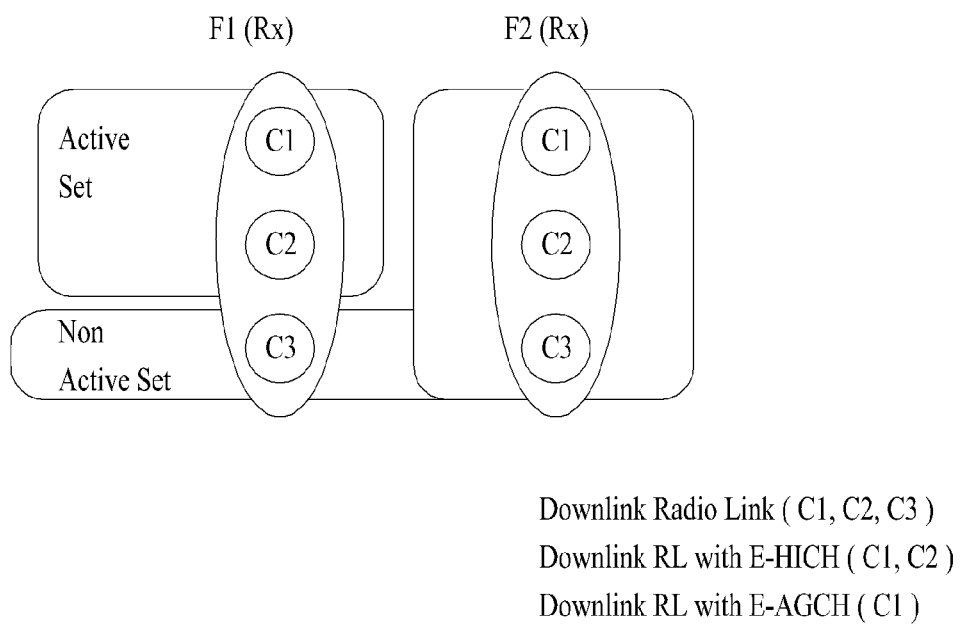
FIG. 8 is a diagram showing an Enhanced Dedicated Channel (E-DCH) active set of a UE which performs dual cell HSDPA.

FIG. 8 is a diagram showing an E-DCH active set of a UE which performs dual cell HSDPA. If the UE uses a plurality of frequencies, a cell having both an uplink radio link and a downlink radio link is included in the active set, but a cell having only an uplink radio link or a downlink radio link is not included in the active set. The active set of the E-DCH transmission is a radio link to receive a downlink control signal for uplink transmission. Accordingly, when data transmission is performed using one uplink frequency and two downlink frequencies, the radio link may be set as shown in FIG. 8. In this case, downlink radio links for receiving the E-HICH are included in the active set and all the other radio links are not included in the active set.

Figure 9:
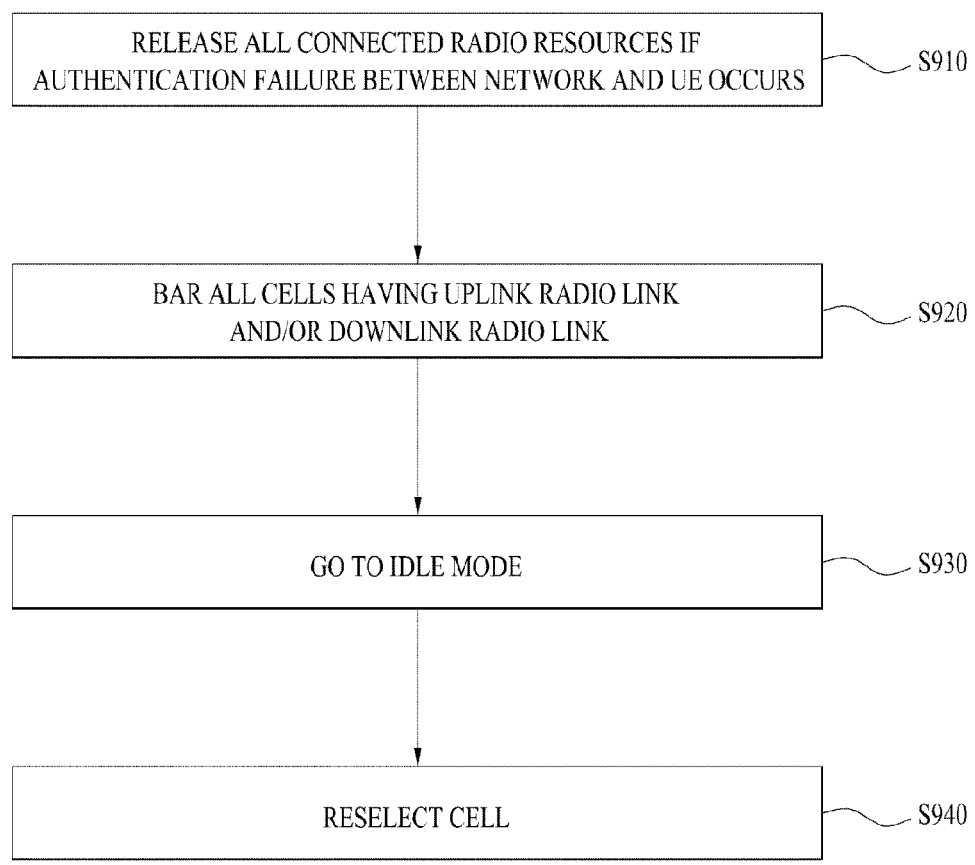
FIG. 9 is a flowchart illustrating a cell selection method according to an embodiment of the present invention.

Next, a cell selection method according to an embodiment of the present invention will be described with reference to FIG. 9. FIG. 9 is a flowchart illustrating a cell selection method according to an embodiment of the present invention.

As shown in FIG. 9, the UE releases all radio resources connected to the UE if authentication between the network and the UE fails (S910).

The NAS layer of the UE performs the authentication process with the network as shown in FIG. 6 and transmits an RRC connection release message to the RRC layer of the UE if authentication failure occurs. The RRC layer which receives the RRC connection release message releases all connected radio resources.

Then, the UE bars all a cell having an uplink radio link with the UE, a cell having a downlink radio link and a cell having an uplink radio link and a downlink radio link (S920).

In the UMTS, if the UE is in the E-DCH state, all the serving HS-DSCH cell and the secondary serving HS-DSCH cells connected to the UE are barred.

In the LTE system, if carrier aggregation is set in the UE, all the primary serving cell and the secondary serving cells connected to the UE are barred.

Then, the UE goes to the idle mode (S930) and performs the cell reselection process (S940).

The UE performs an operation for searching for a cell suitable for camp-on in the cell reselection process. At this time, the UE searches for the cell suitable for camp-on except the barred cell.

In the cell selection criterion of the UMTS system, the cell is a non-barred cell in which the intensity of a signal measured by the UE is greater than the intensity of a signal of a cell, which currently provides a service to the UE, by a predetermined value, which belongs to a Public Land Mobile Network (PLMN) which can be accessed by the UE, and in which a location area updating process or a tracking area updating process of the UE is not inhibited.

That is, the UE may measure the intensities of the signals of peripheral cells after a certain cell is selected and select a peripheral cell having signal intensity greater than the signal intensity of the certain cell by an offset or more if present. At this time, the selected cell must not be barred, must belong to the PLMN which can be accessed by the UE, and must not inhibit the location area updating process of the UE.

In the LTE system, in the cell selection criterion, the cell is a non-barred cell in which the intensity of a signal measured by the UE is greater than the intensity of a signal of a cell, which currently provides a service to the UE, by a predetermined value, which belongs to a Public Land Mobile Network (PLMN) which can be accessed by the UE, and in which a location area updating process or a tracking area updating process of the UE is not inhibited.

The UE selects a cell according to the above-described cell selection criterion and camps on the selected cell.

FIG. 10 is a diagram showing the configuration of a transmitter and a receiver in which the above-described embodiments of the present invention can be implemented, as another embodiment of the present invention.

The transmitter and the receiver include antennas 1000 and 1010 for transmitting and receiving information, data, signals and/or messages, transmission (Tx) modules 1040 and 1050 for controlling the respective antennas so as to transmit messages, reception (Rx) modules 1060 and 1070 for controlling the respective antennas so as to receive messages, memories 1080 and 1090 for storing information associated with the communication with the base station, and processors 1020 and 1030 for controlling the Tx modules, the Rx modules and the memories, respectively.

The antennas 1000 and 1010 serve to transmit the signals generated by the Tx modules 1040 and 1050 to external devices or to receive RF signals from external devices and delivering the signals to the Rx modules 1060 and 1070. If a Multi-Input Multi-Output (MIMO) function is supported, two or more antennas may be included.

The processors 1020 and 1030 control the overall operations of the transmitter and the receiver. In particular, the processor may perform a control function for implementing the embodiments of the present invention, a MAC frame variable control function according to service characteristics and propagation environments, a handover function, an authentication and encryption function, etc. In addition, the processors 1020 and 1030 may further include encryption modules for controlling the encryption of various messages and timer modules for controlling transmission/reception of various messages.

The processor 1020 of the UE performs the authentication process between the network and the UE and bars a cell having an uplink radio link with the UE, a cell having a downlink radio link, and a cell belonging to the active set of the UE, if the authentication process fails.

The Tx modules 1040 and 1050 may perform predetermined coding and modulation with respect to signals and/or data which are scheduled by the processors and are transmitted to the external devices, and send the signals and/or data to the antennas 1000 and 1010.

The Rx modules 1060 and 1070 may perform decoding and demodulation with respect to the RF signals received through the antennas 1000 and 1010, restore the signals to the format of original data, and send the signals to the processors 1020 and 1030.

The Rx module 1070 of the UE receives the authentication request message from the network.

The memories 1080 and 1090 may store programs for processing and control of the processors and perform a function for temporarily storing input/output data (in case of the UE, the uplink (UL) grant allocated by the base station, system information, a station identifier (STID), a flow identifier (FID), an action time, region allocation information, frame offset information, etc.).

In addition, the memories may include at least one storage medium such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of identifying a barred cell in a user equipment of a wireless communication system using a plurality of frequencies, the method comprising:
    releasing a Radio Resource Control (RRC) connection between the user equipment and a network if authentication between the user equipment and the network fails; and
    identifying a cell having a first uplink radio link and a first downlink radio link, a cell having only a second uplink radio link and a cell having only a second downlink radio link as barred cells, if the RRC connection is released.

2. The method according to claim 1, further comprising receiving an RRC connection release message from the network.

3. The method according to claim 1, further comprising selecting a cell suitable for camp-on except the barred cells.

4. The method according to claim 1, wherein the wireless communication system is a Universal Mobile Telecommunication System (UMTS), the cell having the first uplink radio link and the first downlink radio link is included in an active set, and the active set is a set of radio links between the user equipment and the network.

5. The method according to claim 4, wherein the barred cells include a primary serving High Speed-Downlink Shared Channel (HS-DSCH) cell and all secondary serving HS-DSCH cells.

6. The method according to claim 1, wherein the wireless communication system is a Long Term Evolution (LTE) system and the barred cells include a primary serving High Speed-Downlink Shared Channel (HS-DSCH) cell and all secondary serving HS-DSCH cells.

7. The method according to claim 1, wherein the authentication between the user equipment and the network is performed at a Non-Access Stratum (NAS) layer of the user equipment.

8. The method according to claim 7, wherein, if the authentication between the user equipment and the network fails, the NAS layer requests RRC connection release to an RRC layer of the user equipment.

9. The method according to claim 1, wherein each of the first downlink radio link and the second downlink radio link is identified by a frequency and a cell identifier, the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier is at least one of a Primary Scrambling Code (PSC) and a Physical Cell Identifier (PCI).

10. The method according to claim 1, wherein each of the first uplink radio link and the second uplink radio link is identified by a frequency and a cell identifier, the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN) which is an uplink frequency to transmit data through each of the first uplink radio link and the second uplink radio link, and the cell identifier is at least one of an uplink scrambling code, a Physical Random Access Channel (PRACH) scrambling code or a Physical Cell Identifier (PCI) and a Cell Radio Network Temporary Identifier (C-RNTI).

11. The method according to claim 1, wherein each of the first uplink radio link and the second uplink radio link is identified by a frequency and a cell identifier of a downlink radio link, the downlink radio link is used to receive control information necessary for uplink transmission, the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier is at least one of an uplink scrambling code, a Physical Random Access Channel (PRACH) scrambling code or a Physical Cell Identifier (PCI) and a Cell Radio Network Temporary Identifier (C-RNTI).

12. A user equipment of a wireless communication system using a plurality of frequencies, the user equipment comprising:
    a processor configured to release a Radio Resource Control (RRC) connection between the user equipment and a network if authentication between the user equipment and the network fails and to identify a cell having a first uplink radio link and a first downlink radio link, a cell having only a second uplink radio link and a cell having only a second downlink radio link as barred cells.

13. The user equipment according to claim 12, further comprising a reception entity configured to receive an RRC connection release message from the network.

14. The user equipment according to claim 13, wherein the processor and the reception entity belong to an RRC layer.

15. The user equipment according to claim 12, wherein the processor selects a cell suitable for camp-on except the barred cells.

16. The user equipment according to claim 12, wherein the wireless communication system is a Universal Mobile Telecommunication System (UMTS), the cell having the first uplink radio link and the first downlink radio link belongs to an active set, and the active set is a set of radio links between the user equipment and the network.

17. The user equipment according to claim 16, wherein the barred cells include a primary serving High Speed-Downlink Shared Channel (HS-DSCH) cell and all secondary serving HS-DSCH cells.

18. The user equipment according to claim 12, wherein the wireless communication system is a Long Term Evolution (LTE) system and the barred cells include a primary serving High Speed-Downlink Shared Channel (HS-DSCH) cell and all secondary serving HS-DSCH cells.

19. The user equipment according to claim 12, wherein the authentication between the user equipment and the network is performed at a Non-Access Stratum (NAS) layer of the user equipment.

20. The user equipment according to claim 19, wherein, if the authentication between the user equipment and the network fails, the NAS layer requests RRC connection release to an RRC layer of the user equipment.

21. The user equipment according to claim 12, wherein each of the first downlink radio link and the second downlink radio link is identified by a frequency and a cell identifier, the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier is at least one of a Primary Scrambling Code (PSC) and a Physical Cell Identifier (PCI).

22. The user equipment according to claim 12, wherein each of the first uplink radio link and the second uplink radio link is identified by a frequency and a cell identifier, the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN) which is an uplink frequency to transmit data through each of the first uplink radio link and the second uplink radio link, and the cell identifier is at least one of an uplink scrambling code, a Physical Random Access Channel (PRACH) scrambling code or a Physical Cell Identifier (PCI) and a Cell Radio Network Temporary Identifier (C-RNTI).

23. The user equipment according to claim 12, wherein each of the first uplink radio link and the second uplink radio link is identified by a frequency and a cell identifier of a downlink radio link, the downlink radio link is used to receive control information necessary for uplink transmission, the frequency is at least one of a Universal Mobile Telecommunications system (UMTS) Terrestrial Radio Access (UTRA) Absolute Radio Frequency Channel Number (UARFCN) and an Evolved Absolute Radio Frequency Channel Number (EARFCN), and the cell identifier is at least one of an uplink scrambling code, a Physical Random Access Channel (PRACH) scrambling code or a Physical Cell Identifier (PCI) and a Cell Radio Network Temporary Identifier (C-RNTI).

\* \* \* \* \*